United States Patent
Sargis

(10) Patent No.: US 9,291,189 B2
(45) Date of Patent: Mar. 22, 2016

(54) DRIVE SPIKE

(71) Applicant: United Steel and Fasteners, Itasca, IL (US)

(72) Inventor: Isaac Sargis, South Ponte Vedra Beach, FL (US)

(73) Assignee: United Steel and Fasteners, Itasca, IL (US)

( * ) Notice: Subject to any disclaimer, the term of this patent is extended or adjusted under 35 U.S.C. 154(b) by 0 days.

(21) Appl. No.: 14/522,363

(22) Filed: Oct. 23, 2014

(65) Prior Publication Data

US 2015/0252836 A1    Sep. 10, 2015

Related U.S. Application Data

(60) Provisional application No. 61/948,850, filed on Mar. 6, 2014.

(51) Int. Cl.
| | | |
|---|---|---|
| *F16B 25/10* | (2006.01) | |
| *F16B 39/28* | (2006.01) | |
| *E01B 9/10* | (2006.01) | |

(52) U.S. Cl.
CPC .. *F16B 39/28* (2013.01); *E01B 9/10* (2013.01)

(58) Field of Classification Search
CPC .................................. F16B 39/28; F16B 25/10
USPC ........... 411/387.2, 402, 411, 424, 450, 451.1, 411/451.2, 451.3, 451.4, 451.5; 238/372
See application file for complete search history.

(56) References Cited

U.S. PATENT DOCUMENTS

| | | | |
|---|---|---|---|
| 262,404 A | 8/1882 | Gray | |
| 364,301 A | 6/1887 | Rogers | |
| 364,439 A | 6/1887 | Rogers | |
| 368,687 A | 8/1887 | Rogers | |
| 426,008 A | 4/1890 | Groff | |
| 471,179 A * | 3/1892 | Jones | 411/424 |
| 546,269 A | 9/1895 | Coutant | |
| 551,354 A | 12/1895 | Lee | |
| 911,273 A | 2/1909 | Scott | |
| 949,570 A | 2/1910 | Harris | |
| 994,330 A | 6/1911 | Morris | |
| 1,092,683 A | 4/1914 | Wickham | |
| 1,118,832 A | 11/1914 | Wolhaupter | |
| 1,229,560 A | 6/1917 | Whiteman | |
| 1,885,028 A | 10/1932 | Arenz | |
| 1,897,335 A | 2/1933 | Riedel et al. | |
| 1,912,222 A | 5/1933 | Rosenberg | |
| 1,927,389 A | 9/1933 | Castner | |
| 1,960,734 A * | 5/1934 | Fassinger | 411/424 |
| 2,024,071 A | 12/1935 | Taylor et al. | |
| 2,056,309 A | 10/1936 | Osenberg | |

(Continued)

*Primary Examiner* — Roberta Delisle
(74) *Attorney, Agent, or Firm* — Brinks Gilson & Lione

(57) ABSTRACT

A fastener is provided. The fastener includes an elongated shank having a longitudinal axis. The fastener also includes a head portion formed at a first end of the shank. The head portion includes an annular flange extending radially from the longitudinal axis. The fastener also includes a knurled section extending along at least a portion of the shank and disposed adjacent to the annular flange. The knurled section includes a plurality of grooves circumferentially surrounding the portion of the shank. The fastener also includes a smooth section extending along at least a portion of the shank and disposed adjacent to the knurled section. The fastener also includes a helical threaded portion extending axially along at least a portion of said shank toward a second end of the shank and disposed adjacent to the smooth section.

18 Claims, 4 Drawing Sheets

(56) References Cited

U.S. PATENT DOCUMENTS

| | | | | |
|---|---|---|---|---|
| 2,168,854 | A | 8/1939 | Agnew | |
| 2,169,408 | A | 8/1939 | Vellier | |
| 2,352,487 | A | 6/1944 | McNamara, Jr. | |
| 2,601,385 | A | 6/1952 | Graham | |
| 2,663,662 | A | 12/1953 | Graf et al. | |
| 3,025,003 | A | 3/1962 | Fortune | |
| 3,330,177 | A * | 7/1967 | Oliver | 411/424 |
| 3,477,337 | A * | 11/1969 | Racki | 411/28 |
| 3,699,637 | A * | 10/1972 | Rosiek | 29/432.1 |
| 3,731,961 | A | 5/1973 | Becker | |
| 3,782,056 | A | 1/1974 | Osteen | |
| 3,987,698 | A | 10/1976 | Rabe | |
| 4,396,309 | A * | 8/1983 | McCormick | 403/14 |
| 4,718,802 | A | 1/1988 | Rockenfeller et al. | |
| 4,797,022 | A * | 1/1989 | Crigger | 403/408.1 |
| 4,808,051 | A | 2/1989 | Gietl | |
| 4,883,395 | A * | 11/1989 | Klaric | 411/55 |
| 4,941,337 | A | 7/1990 | Emery | |
| 5,036,727 | A * | 8/1991 | Engel | 74/579 E |
| 5,375,957 | A | 12/1994 | Golledge | |
| 5,429,300 | A | 7/1995 | Berna | |
| 5,516,248 | A | 5/1996 | DeHaitre | |
| 5,642,974 | A | 7/1997 | Gabriel et al. | |
| 5,810,534 | A | 9/1998 | Carlisle et al. | |
| 5,879,119 | A * | 3/1999 | Robinson | 411/399 |
| 6,109,850 | A * | 8/2000 | Commins | 411/387.2 |
| 6,185,896 | B1 | 2/2001 | Roberts et al. | |
| 6,190,102 | B1 * | 2/2001 | Vignotto et al. | 411/399 |
| 6,471,140 | B2 * | 10/2002 | Barry et al. | 238/372 |
| 6,808,120 | B2 * | 10/2004 | Oram et al. | 238/372 |
| 7,029,217 | B2 | 4/2006 | Kawatani et al. | |
| 7,207,761 | B2 | 4/2007 | Dill et al. | |
| 7,682,116 | B2 | 3/2010 | Cabrele et al. | |
| 7,717,015 | B2 * | 5/2010 | Nilsen et al. | 81/176.2 |
| 8,529,180 | B1 | 9/2013 | Sargis | |
| 2004/0047713 | A1 | 3/2004 | Jung | |
| 2005/0017086 | A1 | 1/2005 | Barry | |
| 2006/0018733 | A1 | 1/2006 | Dill et al. | |
| 2007/0269287 | A1 * | 11/2007 | Runge et al. | 411/378 |

\* cited by examiner

DRIVE SPIKE

CROSS REFERENCE TO RELATED APPLICATIONS

This application claims priority of U.S. Patent Application No. 61/948,850, filed on Mar. 6, 2014, the entirety of which is hereby incorporated by reference herein.

FIELD OF THE INVENTION

The present invention relates to fasteners. In particular, the present invention relates to a drive spike for driving into a substrate and preventing inadvertent removal of the drive spike from the substrate.

BACKGROUND

Many types of fasteners are known in the art for firmly holding a variety of components together. For example, railroad drive spikes are used to hold tie plates to wooden ties. Drive spikes may also be used to hold together bridges, trestles, wooden piers, and docks.

Typically, for railways, the steel rails have mounting flanges adapted to mate with metallic plates. The metallic plates also contact the wooden ties and are adapted to receive drive spikes to secure the rails to the ties. The spikes are inserted through openings or recesses in the metal plate and driven into the wooden ties. Thus, the steel rails are secured to the wooden ties via the metal plates and the drive spikes.

In use, the drive spikes eventually loosen from the wooden ties as a result of events such as repeated train crossings and environmental conditions. The weight and vibrations from the passing trains cause the spikes to loosen and enlarge the entry holes within the wooden ties. Environmental conditions such as humidity, temperature changes, rain, snow, etc. may also cause the drive spikes to become loosed within the wooden ties. Additionally, vandals may purposely loosen or remove the drive spikes. As the drive spikes become loose, the holes into which the drive spikes are inserted in the wooden ties enlarge. The enlarged holes then become further exposed to environmental conditions, causing the wood to decay more quickly.

Tightening or replacement of the drive spikes is often difficult and costly. Removal of a drive spike may cause further destruction to the wooden tie, making the replacement of the drive spike nearly impossible. Once the drive spike is loosened and/or the wood becomes damaged, the entire wooden tie often requires replacement in order to provide a steel rail that is securely fastened to the wooden tie.

Similar to the railway example, the bridge, trestle, pier and dock drive spike connections are also subject to vibrational and environmental stresses, as well as vandalism, that cause unwanted loosening of the drive spikes within the substrate. Once the drive spike loosens, the substrate into which the spike is driven usually must be replaced in order to securely fasten the bridge, trestle, etc. to the substrate. Replacement of the drive spike itself is generally insufficient to securely fasten objects to the substrate. The enlarged hole in the substrate causes the substrate to become more quickly degraded and thus prevents the drive spike from securely gripping the substrate.

Therefore, it is an object of the present invention to provide a drive spike that securely fastens an object to a substrate, such as wood, and prevents inadvertent loosening or removal of the drive spike from the substrate, thus further reducing the requirement for replacement of the substrate due to damage caused by the insecure fastening of an object to a substrate.

BRIEF SUMMARY

In order to alleviate one or more shortcomings discussed above, a drive spike is provided herein.

A fastener is provided. The fastener includes an elongated shank having a longitudinal axis. The fastener also includes a head portion formed at a first end of the shank. The head portion includes an annular flange extending radially from the longitudinal axis. The fastener also includes a knurled section extending along at least a portion of the shank and disposed adjacent to the annular flange. The knurled section includes a plurality of grooves circumferentially surrounding the portion of the shank. The fastener also includes a smooth section extending along at least a portion of the shank and disposed adjacent to the knurled section. The fastener also includes a helical threaded portion extending axially along at least a portion of said shank toward a second end of the shank and disposed adjacent to the smooth section.

In some embodiments, a fastener is provided that includes an elongated shank having a longitudinal axis. The fastener also includes a head portion formed at a first end of the shank. The head portion includes an annular flange extending radially from the longitudinal axis and an abutment surface adapted to abut a substrate into which the fastener is driven. The fastener also includes a knurled section extending along at least a portion of the shank and disposed adjacent to the head portion. The knurled section includes a plurality of grooves circumferentially surrounding the portion of the shank. The fastener also includes a smooth section extending along at least a portion of the shank and disposed adjacent to the knurled section. The fastener also includes a helical threaded portion extending axially along at least a portion of said shank toward a second end of the shank and disposed adjacent to the smooth section.

In some embodiments, a fastener is provided that includes an elongated shank having a longitudinal axis. The fastener also includes a head portion formed at a first end of the shank. The head portion includes an annular flange extending radially from the longitudinal axis. The fastener also includes a first section extending along at least a portion of the shank and disposed adjacent to the annular flange, the first section having a first diameter. The fastener also includes a knurled section extending along at least a portion of the shank and disposed adjacent to the first section. The knurled section includes a plurality of grooves circumferentially surrounding the portion of the shank. The fastener also includes a smooth section extending along at least a portion of the shank and disposed adjacent to the knurled section. The smooth section has a second diameter that is smaller than the first diameter. The fastener also includes a helical threaded portion extending axially along at least a portion of said shank toward a second end of the shank and disposed adjacent to the smooth section.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

DETAILED DESCRIPTION

Figure 1:
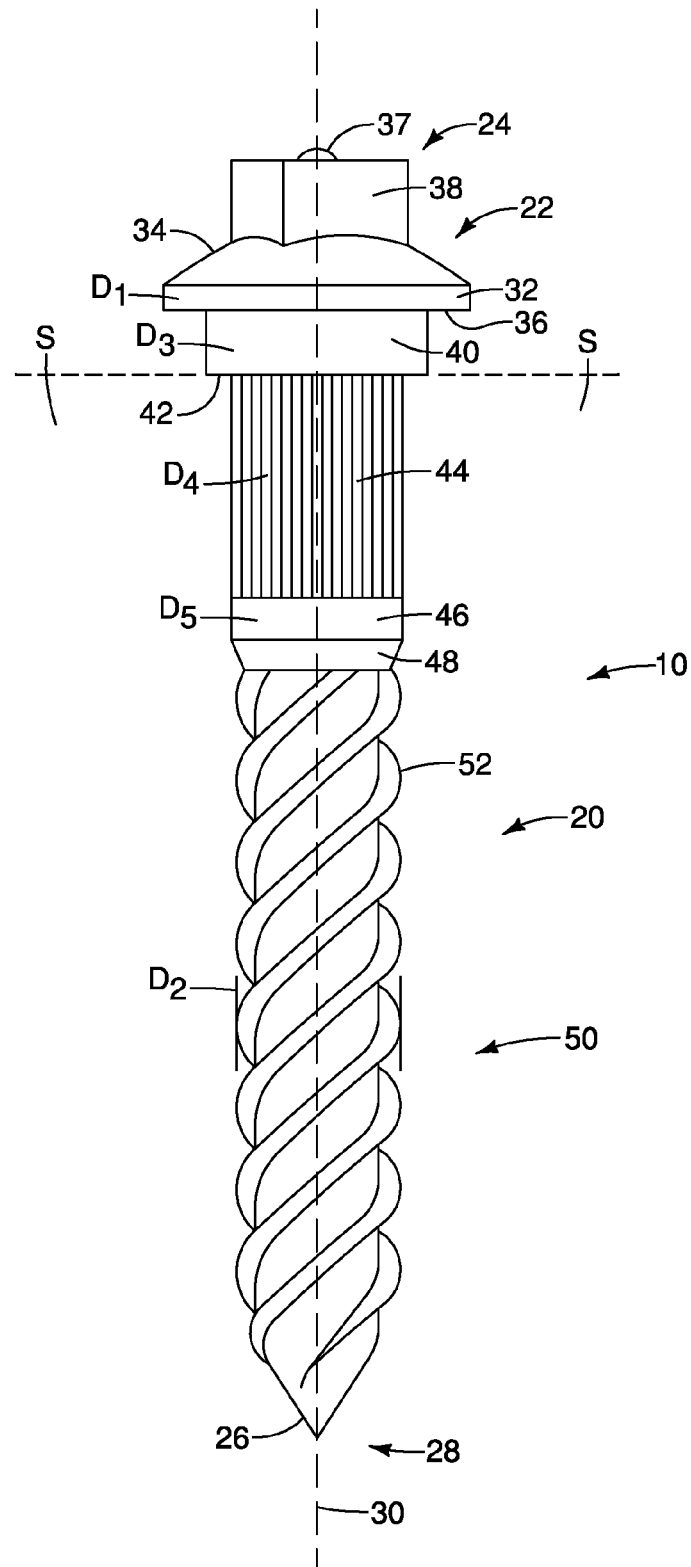
FIG. 1 is a side elevational view of a fastener according to some embodiments.

FIG. 1 shows a fastener 10 in the form of a drive spike, according to some embodiments. The lengths and diameters of the fastener 10 described herein are meant to be non-limiting examples and may be varied as will be understood by one of skill in the art.

The fastener 10 includes an elongated shank 20, a head 22 at a first end portion 24 of the shank 20 and a tip 26 at a second end portion 28 of the shank 20. The tip 26 may be any shape, including blunt and pointed. The fastener 10 has a longitudinal axis 30 extending from the first end portion 24 to the second end portion 28.

The head 22 further comprises an annular flange 32 that extends radially from the shank 20. The annular flange 32 may include a dome-shaped upper surface 34 and a flattened lower surface 36 that extends radially beyond the shank 20. The head 22 may further comprise a protrusion 37 that extends from the first end portion 24 of the shank 20. The protrusion 37 may be hemispherical in shape and adapted to be engaged by a striking tool to drive the fastener 10 into a substrate S. The protrusion 37 is adapted to receive significant force and is further adapted to deform as a result of the striking force.

Figure 4:
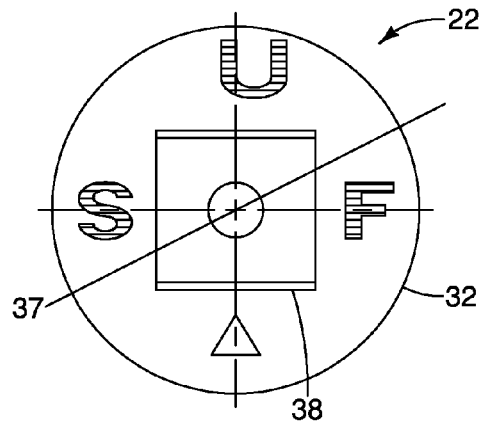
FIG. 4 a top plan view of FIG. 1.

The head 22 also comprises an outer surface 38 adapted to be engaged by a gripping tool such as a wrench or a socket that may be used to apply torque to the fastener 10 to drive the fastener 10 into the substrate S. In some embodiments, the outer surface 38 may be polygonally shaped. However, the outer surface 38 may be any shape that may be used with a variety of tools. Alternatively, the outer surface 38 does not need to be engaged to drive the fastener 10 into the substrate S. For example, a hole may be pre-drilled in the substrate S and the fastener 10 may be driven into the substrate S using a striking tool to strike the protrusion 37 of the head 22 and thereby insert the fastener 10 into the substrate S. As described below, additional features of the fastener 10 facilitate insertion of the fastener 10 into the substrate S using a driving force. FIG. 4 shows a top view of the head 22 of the fastener 10, according to some embodiments. By way of non-limiting example, the head 22 may have a square cross sectional shape having sides extending radially outwardly from the longitudinal axis 30. Each side may extend about 0.75 to about 0.81 inches in some embodiments.

Figure 2:
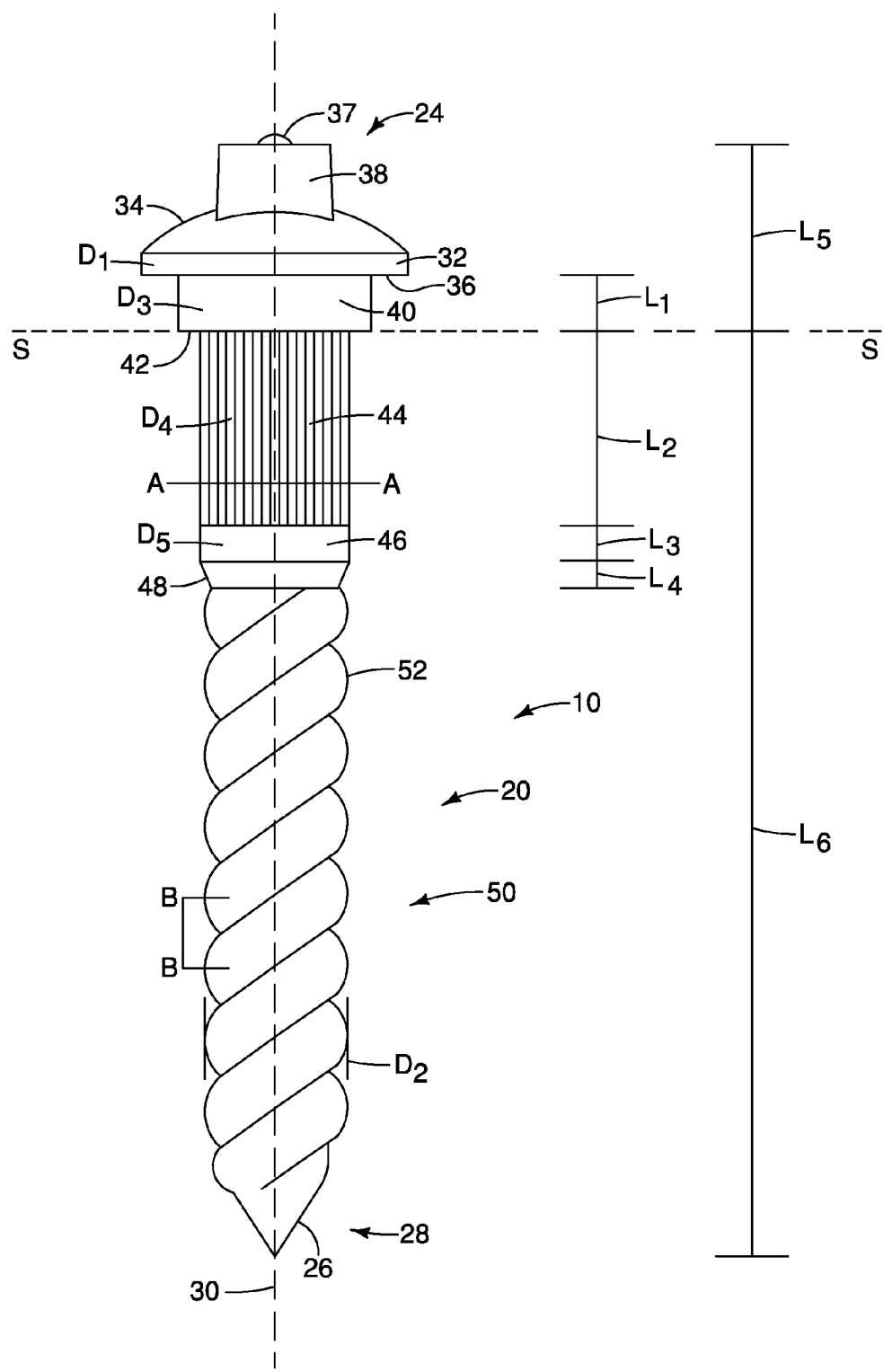
FIG. 2 is a side elevational view of a fastener according to some embodiments.

As shown in FIGS. 1 and 2, the annular flange 32 extends radially from the longitudinal axis 30 of the fastener 10. In some embodiments, the annular flange 32 extends beyond the circumference of the shank 20. As shown in FIGS. 1 and 2, the annular flange 32 has a diameter $D_1$ that is greater than a diameter $D_2$ of a threaded portion of the shank 20 (described below). In some embodiments, the fastener 10 further includes a first section 40 adjacent to the annular flange 32. The first section 40 may be cylindrically shaped and have a smooth surface. The first section 40 may also be polygonally shaped or may include one or more flattened sides. In some embodiments, the first section 40 is positioned directly adjacent to the annular flange 32. The first section 40 includes an abutment surface 42 positioned apart from the annular flange 32. The abutment surface 42 is configured to abut the substrate S into which the fastener 10 is driven so that the first section 40 is positioned above the substrate S when the fastener 10 has been driven into the substrate S. The abutment surface 42 has a diameter that is wider than the cavity of the tie plate so that it rests on the tie plate bearing surface. The first section 40 has a diameter $D_3$ that is less than the diameter $D_1$ of the annular flange 32 and greater than the diameter $D_2$ of the shank 20.

By way of non-limiting example, the diameter $D_1$ may be about 1.75 inches, the diameter $D_2$ may be about 0.94 inches, and the diameter $D_3$ may be about 1.25 inches. In some embodiments, the diameter $D_1$ is about 1.9 times wider than the diameter $D_2$, and the diameter $D_1$ is about 1.4 times wider than diameter $D_3$. In some embodiments, diameter $D_3$ is about 1.3 times wider than the diameter $D_2$. The first section 40 may be sized and shaped to receive a tool (not shown) to remove the fastener 10 from the substrate S. The smaller diameter $D_3$ of the first section 40 relative to the diameter $D_1$ of the annular flange 32 allows the tool to contact the lower surface 36 of the annular flange 32 that is positioned above the substrate S so that the tool can pull the fastener 10 out of the substrate S. A length $L_1$ of the first section 40 may be provided so that the tool fits between the substrate S and the lower surface 36 of the annular flange 32. By way of non-limiting example, the length $L_1$ may be about 0.38 inches.

As shown in FIGS. 1 and 2, the fastener 10 may also include a knurled section 44 adjacent to the first section 40 so that the first section 40 is between the annular flange 32 and the knurled section 44. In some embodiments, the knurled section 44 is disposed between the first section 40 and a smooth section 46. The knurled section 44 may be cylindrically shaped and may include a plurality of axial grooves 45 and peaks 47 as shown in the cross sectional view in FIG. 4. In some embodiments, the peaks 47 may include a leading edge. The knurled section 44 is configured to allow the fastener 10 to be driven into the substrate S and to resist removal of the fastener 10 from the substrate S. The knurled section 44 has a diameter $D_4$ measured at the peaks 47 that is slightly larger than the diameter $D_2$ and the diameter $D_5$ and less than the diameter $D_3$. By way of non-limiting example, the diameter $D_4$ may be about 0.97 inches and the length $L_2$ of the knurled section 44 may be about 1.5 inches. For the knurled section 44 having a diameter of $D_4$ of about 0.97 inches, the number of peaks 47 is greater than 40. The peaks 47 may all be equal in size and shape extending around the shank 20. In some embodiments, the depth of grooves 45 may be about 0.025 inches to about 0.035 inches. In some embodiments, the peaks 47 extend substantially parallel to the longitudinal axis 30 of the shank 20.

The shank 20 may also include a smooth section 46 adjacent to the knurled section 44. In some embodiments, the knurled section 44 is directly adjacent to the smooth section 46. The smooth section 46 may be cylindrically shaped and have a smooth surface. The smooth section 46 may also be polygonally shaped or may include one or more flattened sides. In some embodiments, the smooth section 46 is free from knurls, protrusions and threads. The smooth section 46 has a diameter $D_5$ that is less than the diameter $D_1$ and the diameter $D_3$. In some embodiments, the diameter $D_5$ is about substantially the same as the diameter $D_2$ of the shank 20. By way of non-limiting example, the diameter $D_5$ may be about 0.94 inches. The smooth section 46 is configured to be positioned within the substrate S. A length $L_3$ of the smooth section 46 may be about 0.25 inches. In some embodiments, a shank transition section (not shown, see FIG. 3) may be included between the smooth section 46 and the knurled section 44. The shank transition section may be a result of manufacturing and machining tolerances, limitations, and capabilities where the knurled section 44 does not extend all the way to the smooth section 46.

The shank 20 may also include a transition section 48 extending between the knurled section 44 and a threaded portion 50. In some embodiments, the transition section 48 tapers inward from the knurled section 44 to the threaded portion 50 so that the threads 52 can be rolled on the threaded portion 50. In some embodiments, the transition section 48 is disposed between the smooth section 46 and the threaded portion 50. In some embodiments, the transition section 48 has a length $L_4$ of about 0.2 inches. In some embodiments, the transition section 48 may have a length $L_4$ that is less than about 0.1 inches.

The shank 20 also includes a threaded portion 50 that includes one or more threads 52. In some embodiments, the threads 52 may be helical fluted threads as shown in FIG. 1. The threads 52 extend from the transition section 48 to about the tip 26 of the shank 20. The angle at the end of the threads 52 may be about 40° to about 50°, more preferably about 45°. In some embodiments, the threaded portion 50 may include 4 fluted threads 52.

Figure 5:
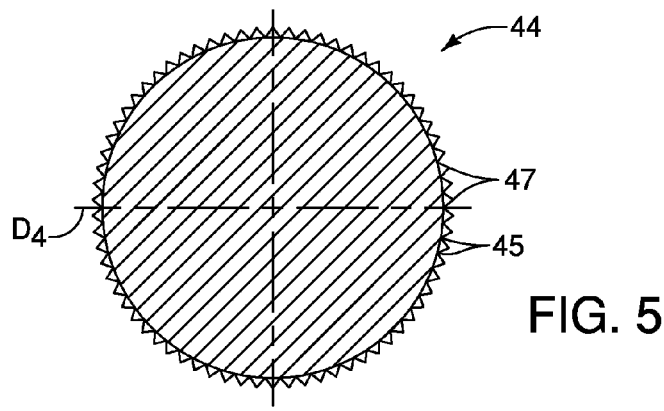
FIG. 5 is a sectional view through line A-A of FIG. 2.
Figure 6:
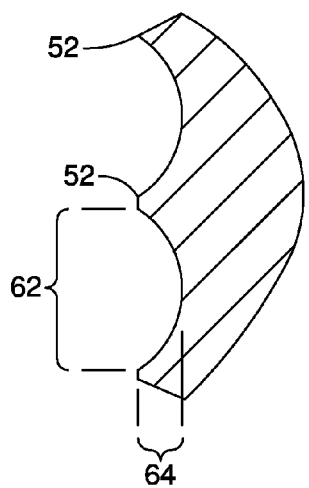
FIG. 6 is a sectional view through line B-B of FIG. 2.

FIG. 5 is a sectional view through line A-A of FIG. 2. As shown in FIG. 5, in some embodiments, a width 62 of each helical turn of the threads 52 is about 0.5 inches, although any width may be used. In some embodiments, a depth 64 of the threads 52 protruding from the shank 20 is about 0.13 inches, although any depth may be used.

In some embodiments, a length $L_5$ of the head 22 and the first section 40 and the protrusion 37 is about 1.38 inches. The protrusion 37 extends about 0.13 inches above the head 22. The length $L_5$ represents the length that is positioned above the substrate S. The length $L_6$ of the shank 20 from the knurled section 44 to the tip 26 is about 6.5 inches. The length $L_6$ represents the length of the fastener 10 that is inserted into the substrate S. In some embodiments, the length of the fastener 10 may be about 7.88 inches and the knurled section 44 may be about ⅕ of the length of the fastener 10. In some embodiments, the length $L_6$ may be about 4.7 times longer than the length $L_5$. In some embodiments, the knurled section 44 may be spaced about 1.13 inches from the first section 40. In some embodiments, the first section 40 may be about ½₁ of the length of the fastener 10. In some embodiments, the length of the smooth section 46 may be about ½₂ of the length of the fastener 10. In some embodiments, the length of the transition section 48 may be about ½₃₉ the length of the fastener 10. Other lengths and diameters for each of the dimensions described herein may be used and remain within the scope of the invention.

In some embodiments, the fastener 10 comprises a metal, more preferably iron or steel, most preferably carbon steel, for example C1035. Any material suitable for forming and having sufficient strength for the fastener may be used as will be understood by one of skill in the art.

Figure 3:
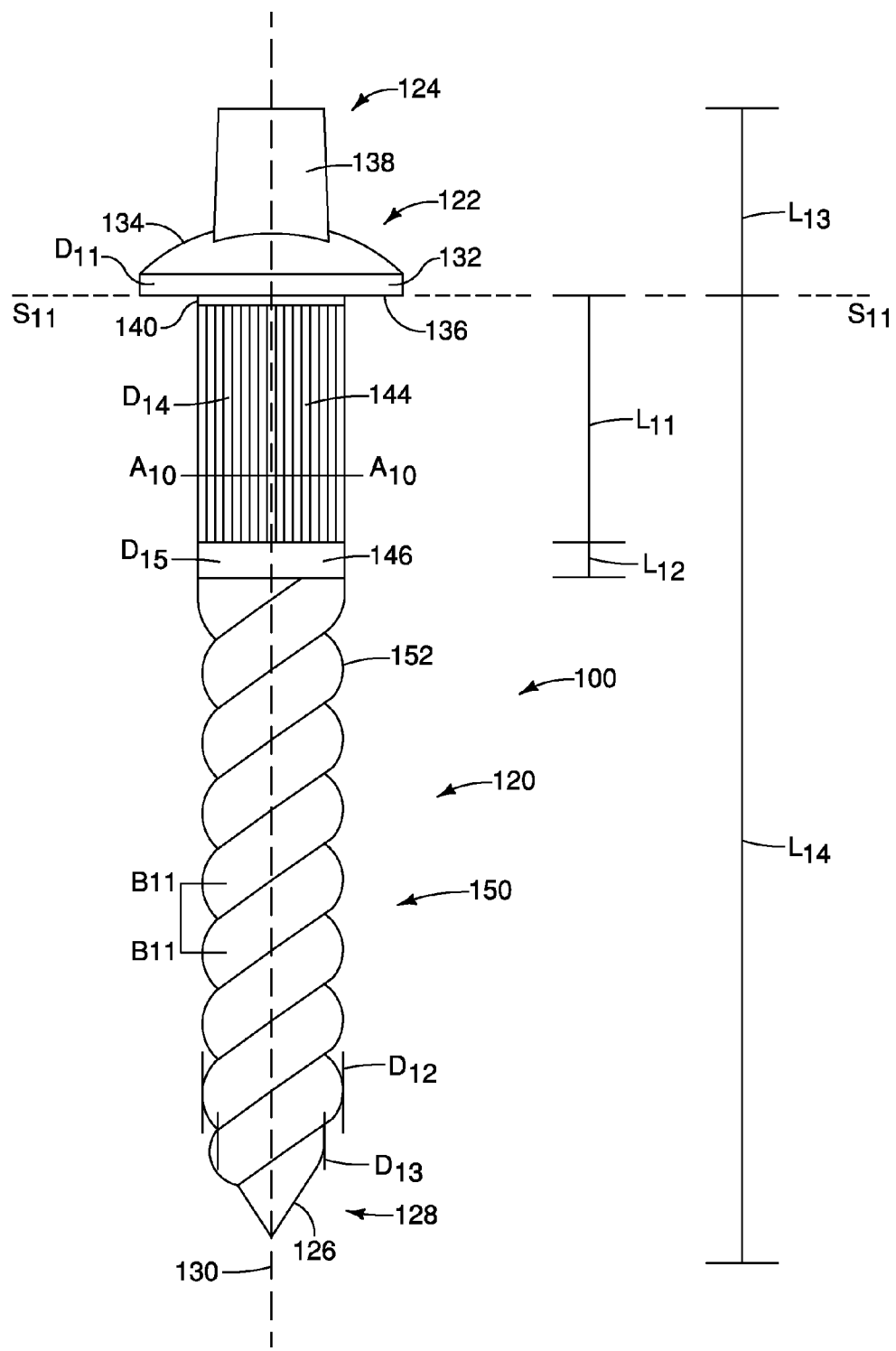
FIG. 3 is a side elevational view of a fastener according to some embodiments.

FIG. 3 shows a fastener 100 in the form of a drive spike, according to some embodiments. The lengths and diameters of the fastener 100 described herein are meant to be non-limiting examples and may be varied as will be understood by one of skill in the art.

The fastener 100 includes an elongated shank 120, a head 122 at a first end portion 124 of a shank 120 and a tip 126 at a second end portion 128 of the shank 120. The tip 126 may be any shape, including blunt and pointed. The fastener 100 has a longitudinal axis 130 extending from the first end portion 124 to the second end portion 128.

The head 122 further comprises an annular flange 132 that extends radially from the shank 120. The annular flange 132 may include a dome-shaped upper surface 134 and a flattened lower surface 136 that extends radially beyond the shank 120. Although not featured, the head 122 may further include a protrusion that extends from the first end portion 124 of the shank 120. The protrusion may be hemispherical in shape and adapted to be engaged by a striking tool to drive the fastener 100 into a substrate $S_{11}$. The protrusion is adapted to receive significant force and is further adapted to deform as a result of the striking force.

The head 122 also comprises an outer surface 138 adapted to be engaged by a gripping tool such as a wrench or a socket that may be used to apply torque to the fastener 100 to drive the fastener 100 into the substrate $S_{11}$. In some embodiments, the outer surface 138 may be polygonally shaped. However, the outer surface 138 may be any shape that may be used with a variety of tools. Alternatively, the outer surface 138 does not need to be engaged to drive the fastener 100 into the substrate $S_{11}$. For example, a hole may be pre-drilled in the substrate $S_{11}$ and the fastener 100 may be driven into the substrate $S_{11}$ using a striking tool to strike the head 122 and thereby insert the fastener 100 into the substrate $S_{11}$. As described below, additional features of the fastener 100 facilitate insertion of the fastener 100 into the substrate $S_{11}$ using a driving force. By way of non-limiting example, the head 122 may have a square cross sectional shape having sides extending radially outwardly from the longitudinal axis 130. Each side may extend from about 0.82 to about 0.88 inches in some embodiments.

As shown in FIG. 3, the annular flange 132 extends radially from the longitudinal axis 130 of the fastener 100. In some embodiments, the annular flange 132 extends beyond the circumference of the shank 120. As shown in FIG. 3, the annular flange 132 has a diameter $D_{11}$ that is greater than a diameter $D_{12}$ and diameter $D_{13}$ of a threaded portion 150 of the shank 120 (described below). The annular flange 132 has a bottom surface 136. The bottom surface 136 of the annular flange 132 comprises an abutment surface configured to abut the substrate $S_{11}$ into which the fastener 100 is driven so that the annular flange 132 is positioned above the substrate $S_{11}$ when the fastener 100 has been driven into the substrate $S_{11}$. The annular flange 132 has a diameter that is wider than the cavity of the tie plate so that it rests on the tie plate bearing surface.

By way of non-limiting example, the diameter $D_{11}$ may be about 1.75 inches and the diameter $D_{12}$ may be about 0.94 inches. The shank 120 may have an inner diameter $D_{13}$. The inner diameter $D_{13}$ may be about 0.69 inches. In some embodiments, the diameter $D_{11}$ is about 1.9 times wider than the diameter $D_{12}$, and the diameter $D_{11}$ is about 2.5 times wider than the inner diameter $D_{13}$. In some embodiments, the diameter $D_{12}$ is about 1.4 times wider than the inner diameter $D_{13}$.

As shown in FIG. 3, the fastener 100 may also include a knurled section 144 adjacent to the annular flange 132. In some embodiments, a shank transition section 140 may be included between the annular flange 132 and the knurled section 114. The shank transition section 140 may be a result of manufacturing and machining tolerances, limitations, and capabilities where the knurled section 144 does not extend all the way to the annular flange 132. The shank transition section 140 has a diameter that is less than diameter $D_{11}$ of the annular flange 132. Although not featured in FIG. 3, the fastener may not include a shank transition section, according to some embodiments. In some embodiments, the knurled section 144 is disposed between the shank transition section 140 and a smooth section 146. In some embodiments, the smooth section 146 is free from knurls, protrusions and threads. In some embodiments, the smooth section 146 has a length $L_{12}$ of about 0.2 inches. The knurled section 144 may be cylindrically shaped and may include a plurality of axial grooves and peaks. In some embodiments, the peaks may include a leading edge. The knurled section 144 is configured to allow the fastener 100 to be driven into the substrate $S_{11}$ and to resist removal for the fastener 100 from the substrate $S_{11}$. The knurled section 144 has a diameter $D_{14}$ measured at the peaks that is slightly larger than the diameters $D_{12}$, the inner diameter $D_{13}$, and the diameter $D_{15}$ and less than the diameter $D_{11}$. By way of non-limiting example, the diameter $D_{14}$ may be about 0.97 inches and a length $L_{11}$ of the knurled section 144 may be about 1.5 inches. For the knurled section 144 having a diameter $D_{14}$ of about 0.97 inches, the number of peaks is greater than 40. The peaks may all be equal in size and shape extending around the shank 120. In some embodiments, the depth of the grooves may be about 0.025 inches to about 0.035 inches. In some embodiments, the peaks extend substantially parallel to the longitudinal axis 130 of the shank 120.

In some embodiments, the shank 120 may also include a transition section (not shown) similar to the transition section 48 shown in FIG. 1 and described above. The transition section extends between the smooth section 146 and a threaded portion 150. In some embodiments, the transition section tapers inward from the knurled section 144 to threaded portion 150 so that the threads 152 can be rolled on the threaded portion 150. In some embodiments, the transition section has a length $L_{12}$ that is less than about 0.1 inches.

The shank 120 also includes the threaded portion 150 that includes one or more threads 152. In some embodiments, the threads 152 may be helical fluted threads as shown in FIG. 3. The threads 152 extend from the smooth section 146 or the transition section where included to about the tip 126 of the shank 120. The angle at the end of the threads 152 may be about 40° to about 50°, more preferably about 45°. In some embodiments, the threaded portion 150 may include 4 fluted threads 152.

Similar to FIG. 5, the width of each helical turn of the threads 152 at $A_{10}$-$A_{10}$ is about 0.5 inches, although any width may be used. In some embodiments, a depth of the threads 152 protruding from the shank 120 is about 0.13 inches, although any depth may be used.

In some embodiments, a length $L_{13}$ of the head 122 is about 1.25 inches. In some embodiments, the length of the outer surface 138 of the head 122 is about 0.88 inches. A Length $L_{13}$ represents the length that is positioned above the substrate $S_{11}$. The length $L_{14}$ of the shank 120 from the knurled section 144 to the tip 126 is about 6.5 inches. The length $L_{14}$ represents the length of the fastener 100 that is inserted into the substrate $S_{11}$. In some embodiments, the length of the fastener 100 may be about 7.75 inches and the knurled section 144 may be about ⅕ of the length of the fastener 100. In some embodiments, the length $L_{14}$ may be about 5.2 times longer than the length $L_{13}$. In some embodiments, the length of the smooth section 146 may be about 1/32 of the length of the fastener 100. Other lengths and diameters for each of the dimensions described herein may be used and remain within the scope of the invention.

In some embodiments, the fastener 100 comprises a metal, more preferably iron or steel, most preferably carbon steel, for example C1035. Any material suitable for forming and having sufficient strength for the fastener may be used as will be understood by one of skill in the art.

Although the invention herein has been described in connection with a preferred embodiment thereof, it will be appreciated by those skilled in the art that additions, modifications, substitutions, and deletions not specifically described may be made without departing from the spirit and scope of the invention as defined in the appended claims. It is therefore intended that the foregoing detailed description be regarded as illustrative rather than limiting, and that it be understood that it is the following claims, including all equivalents, that are intended to define the spirit and scope of this invention.

The invention claimed is:

1. A fastener comprising:
   an elongated shank having a longitudinal axis;
   a head portion formed at a first end of the shank, the head portion comprising an annular flange extending radially from the longitudinal axis;
   a knurled section extending along at least a portion of the shank and disposed directly adjacent to the annular flange, the knurled section comprising a plurality of grooves circumferentially surrounding the portion of the shank;
   a smooth section extending along at least a portion of the shank and disposed adjacent to the knurled section; and
   a helical threaded portion extending axially along at least a portion of said shank toward a second end of the shank and disposed adjacent to the smooth section.

2. The fastener of claim 1, wherein the annular flange includes a bottom abutment surface, the bottom abutment surface is adapted to abut a substrate into which the fastener is driven so that the annular flange is positioned above the substrate when the fastener has been driven into the substrate.

3. The fastener of claim 1, wherein the grooves extend parallel to the longitudinal axis of the shank.

4. The fastener of claim 1, wherein said helical threaded portion further comprises a plurality of flutes.

5. The fastener of claim 1, wherein the smooth section is cylindrically shaped.

6. The fastener of claim 1, wherein the knurled section comprises greater than 40 grooves.

7. A fastener comprising:
   an elongated shank having a longitudinal axis;
   a head portion formed at a first end of the shank, the head portion comprising an annular flange extending radially from the longitudinal axis and an abutment surface adapted to abut a substrate into which the fastener is driven;
   a knurled section extending along at least a portion of the shank and disposed directly adjacent to the abutment surface of the head portion, the knurled section comprising a plurality of grooves circumferentially surrounding the portion of the shank;
   a smooth section extending along at least a portion of the shank and disposed adjacent to the knurled section; and
   a helical threaded portion extending axially along at least a portion of said shank toward a second end of the shank and disposed adjacent to the smooth section.

8. The fastener of claim 7, wherein the annular flange comprises the abutment surface.

9. The fastener of claim 7, wherein the head portion further comprises a first section disposed adjacent to the annular flange, the first section comprising the abutment surface.

10. The fastener of claim 7, further comprising a transition section disposed adjacent to the smooth section, the transition section comprising a taper.

11. The fastener of claim 7, wherein the knurled section has a length that is about ⅕ of the length of the fastener.

12. A fastener comprising:
   an elongated shank having a longitudinal axis;

a head portion formed at a first end of the shank, the head portion comprising an annular flange extending radially from the longitudinal axis;

a first section extending along at least a portion of the shank and disposed adjacent to the annular flange, the first section having a first diameter and the first section includes an abutment surface positioned apart from the flange;

a knurled section extending along at least a portion of the shank and disposed directly adjacent to the first section, the knurled section comprising a plurality of grooves circumferentially surrounding the portion of the shank;

a smooth section extending along at least a portion of the shank and disposed adjacent to the knurled section, the smooth section having a second diameter that is smaller than the first diameter and wherein the knurled section has a third diameter that is greater than the second diameter of the smooth section; and a helical threaded portion extending axially along at least a portion of said shank toward a second end of the shank and disposed adjacent to the smooth section.

13. The fastener of claim 12, further comprising a transition section disposed between the smooth section and the helical threaded portion, the transition section having an inward taper toward the helical threaded portion.

14. The fastener of claim 12, wherein the abutment surface is configured to abut a substrate into which the fastener is driven so that the first section is positioned above the substrate when the fastener has been driven into the substrate.

15. The fastener of claim 12, wherein the annular flange comprises a dome shaped upper surface and a flat lower surface.

16. The fastener of claim 12, wherein the annular flange has a fourth diameter that is wider than the first diameter of the first section.

17. The fastener of claim 12, wherein the smooth section has a diameter that is about the same diameter as the knurled section.

18. The fastener of claim 12, wherein the knurled section has a length that is about $\frac{1}{5}$ of the length of the fastener.

* * * * *